United States Patent [19]

Cole

[11] Patent Number: 4,491,723
[45] Date of Patent: Jan. 1, 1985

[54] HEATING CIRCUIT WITH OVERHEAT SAFETY CONTROL FEATURE
[75] Inventor: Graham M. Cole, Lymington, England
[73] Assignee: Dreamland Electrical Appliances P.L.C., Southampton, England
[21] Appl. No.: 465,091
[22] Filed: Feb. 8, 1983
[30] Foreign Application Priority Data
Feb. 15, 1982 [GB] United Kingdom ............... 8204331
[51] Int. Cl.³ ............................................. H05B 1/02
[52] U.S. Cl. .................................. 219/505; 219/212; 219/511; 219/483
[58] Field of Search ............... 219/505, 504, 212, 501, 219/528, 216, 483, 486, 510, 511; 323/268, 369; 338/26

[56]  References Cited
U.S. PATENT DOCUMENTS
4,251,718  2/1981  Cole ................................ 219/505
4,278,874  7/1981  Cole ................................ 219/505

Primary Examiner—M. H. Paschall
Attorney, Agent, or Firm—Mason, Fenwick & Lawrence

[57]    ABSTRACT

A heating circuit for an electric blanket or the like comprises a heating conductor, a sensor conductor and separating means which separates the conductors and has an impedance that falls with increasing temperature and/or which will melt in the event of overheating to allow contact between the conductors. A thermal fuse and a first diode are connected in series with the heating conductor between AC supply input terminals, and a resistor is thermally coupled to the thermal fuse and electrically connected such that the resistor and the impedance of the separating means are connected in series between the input terminals. A drop in the impedance of the separating means due to overheating will cause the current through the resistor to increase, so heating the resistor to cause the thermal fuse to disconnect the circuit from the supply. The resistor is connected in series with the heating conductor and the first diode and a second diode bypasses the resistor during those half-cycles of the AC supply voltage during which the first diode conducts.

12 Claims, 5 Drawing Figures

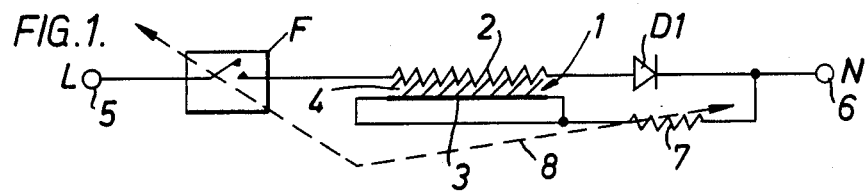
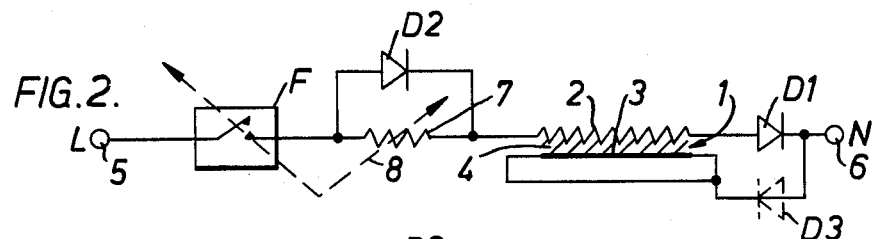
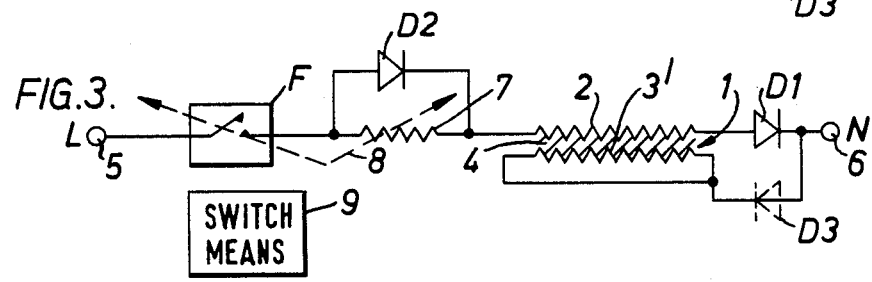
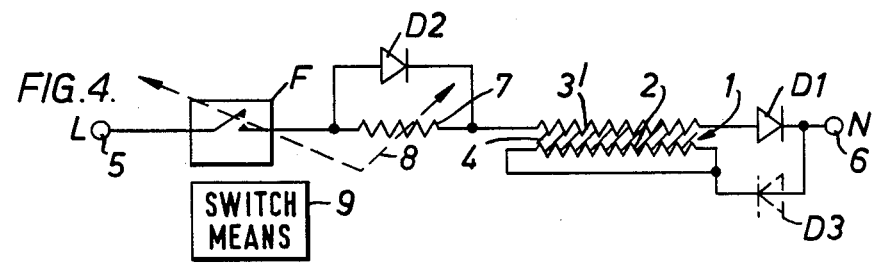
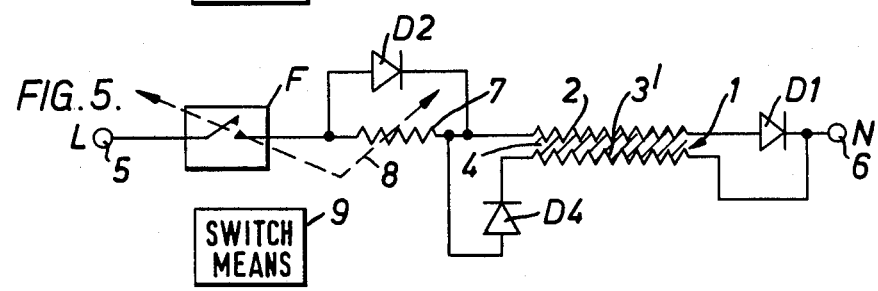

HEATING CIRCUIT WITH OVERHEAT SAFETY CONTROL FEATURE

BACKGROUND OF THE INVENTION

1. Field of the invention

This invention relates to heating circuits. In particular, but not exclusively, this invention relates to heating circuits for flexible heating devices such as electric blankets and pads.

2. Description of the prior art

My U.S. Pat. No. 4,251,718, issued Feb. 17, 1981 and assigned to the assignees hereof, discloses a heating circuit comprising input terminals for connection to an AC supply, a first elongate conductor to effect heating, a second elongate conductor substantially coextensive with the first conductor, separating means which separates the two conductors and which has an impedance that falls with increasing temperature and/or which will melt in the event of overheating to allow contact between the two conductors, thermally-operative circuit interruption means, half-wave rectifier means connected in series with the circuit interruption means and the first conductor betwen the input terminals, and a resistor electrically connected such that the resistor and the impedance of the separating means are connected in series between the input terminals, the resistor being thermally coupled to the circuit interruption means whereby in the event of overheating of the separating means the resultant drop in the impedance of the separating means will cause the current through the resistor to increase to heat the resistor to cause the circuit interruption means to disconnect the circuit from the supply. Such a heating circuit is referred to hereinafter as "a heating circuit of the kind described".

Due to the provision of the half-wave rectifier means, current does not flow through the first elongate conductor during alternate half-cycles of the AC supply voltage. Consequently, during such half-cycles (hereinafter referred to as "the normally non-conductive half-cycles") the first elongate conductor is at a uniform potential along its length whereby, in the event of a localised overheat (i.e. an overheat at a particular position along the length of the first elongate conductor), the increased magnitude of the current flowing through the resistor will not vary in dependence on the location of the overheat. Thus, even though there is a voltage gradient along the first elongate conductor during the other half-cycles (hereinafter referred to as "the normally conductive half-cycles", the mean current flowing through the resistor in the event of a localised overheat will always exceed a minimum value sufficient to cause disconnection of the circuit from the supply, regardless of the location of the overheat.

In a particular form of the heating circuit described in my U.S. Pat. No. 4,251,781, the said resistor is connected between the second elongate conductor and one of the input terminals to which the half-wave rectifier means is connected. A disadvantage of this arrangement is that a short-circuit failure of the half-wave rectifier means will double the heating power and render the protection provided by the circuit ineffective over at least part of the length of the first elongate conductor. The likelihood of short-circuit failure of the half-wave rectifier means can be minimised by arranging for it to comprise two rectifying elements (e.g. semiconductor diodes) connected in series. Even so, each of these rectifying elements, apart from carrying full load current, will be subjected to reverse voltage transients which can cause reverse junction breakdown (Zener effect) which can result in short circuit failure of a semiconductor chip or chips containing the rectifying elements.

SUMMARY OF THE INVENTION

An object of the invention is to provide an improved heating circuit in which the above disadvantage is overcome or at least minimised.

According to the present invention there is provided a heating circuit of the kind described in which said resistor is connected in series with the first elongate conductor and the half-wave rectifier means with the first elongate conductor connected between the resistor and the half-wave rectifier means, and second half-wave rectifier means is connected in parallel with the resistor in such a sense that it conducts and therefore bypasses the resistor during those half-cycles of the AC supply voltage during which the first-mentioned half-wave rectifier means conducts.

Thus, in a circuit embodying the present invention, the resistor is connected in series with the first elongate conductor, though the heating current does not normally flow through the resistor due to the second half-wave rectifier means. With a circuit embodying the present invention, short-circuit failure of the first-mentioned half-wave rectifier means results in sufficient current flowing through the resistor during the normally nonconductive half-cycles of the AC supply voltage to cause operation of the thermally-operative circuit interruption means. In other words, the circuit configuration is such that the resistor will operate the circuit interruption means not only in the event of an overheat but also in the event of short-circuit failure of the first-mentioned half-wave rectifier means. Failure of the second half-wave rectifier means is unlikely because it is shunted by the said resistor, whose impedance is low compared to the reverse impedance of the first-mentioned half-wave rectifier means, whereby transients on the supply voltage are "handled" largely by the first half-wave rectifier means.

Heating circuits in accordance with the invention are applicable to the heating of a variety of objects or media. They may be used, for example, in pipe heating, soil warming, industrial process heating or in space heating, for instance in ceiling heating or under-floor heating. The invention is however, especially suited to the heating of flexible heating devices, in particular electric blankets (i.e. electrically heated overblankets and electrically heated underblankets) and electrically-heated pads.

BRIEF DESCRIPTION OF THE DRAWINGS

The invention will now be further described, by way of illustrative and non-limiting example, with reference to the accompanying drawing, in which like reference numerals indicate like items throughout, and in which:

FIG. 1 is a circuit diagram of a heating circuit disclosed in my U.S. Pat. No. 4,251,718;

FIG. 2 is a circuit diagram of a modified version of the heating circuit of FIG. 1, which modified circuit embodies the present invention; and FIGS. 3 to 5 are circuit diagrams of another heating circuit embodying the invention, which circuit is a modification of that shown in FIG. 2, the different figures showing the circuit switched into three respective different configurations.

The heating circuit shown in FIG. 1 of the accompanying drawings, which is substantially identical to that shown in FIG. 1 of my above-mentioned U.S. Pat. No. 4,251,718, comprises a cable 1 which is, for example, incorporated in an electric blanket or pad in a manner known in the art. The cable 1 comprises a heating conductor 2 and a sensor conductor 3 separated by a material 4 shown in the drawing by cross-hatching. The heating conductor 2 is of resistance wire and is therefore represented as a resistor. The sensor conductor 3 does not, in this case, carry heating current, and can therefore be a low resistance conductor, for example of copper. The cable 1 is preferably so constructed that the conductors 2 and 3 are coaxial: the heating conductor 2 is the inner one of the conductors and is wound on an electrically insulative core, the material 4 surrounds the conductor 2, the conductor 3 is wrapped or wound around the material 4, and an outer sheath covers the sensor conductor 3. The material 4 is of such a nature that its impedance falls with an increase in temperature, preferably logarithmically. A suitable material is polyvinyl chloride (PVC). The PVC may, as is known in the art, be doped with a material that increases its conductivity, but it is preferred that undoped PVC be used. The cable 1 may in fact be constructed along the lines described in UK patent specifications Nos. 746,017 and 841,604.

The heating conductor 2 is connected in series with a thermal fuse F, and a half-wave rectifier means in the form of a diode D1, between a pair of input terminals 5, 6 for connection to the live (L) and neutral (N) conductors of an AC power supply (not shown), the thermal fuse (F) being adjacent the live terminal 5 and the diode D1 being adjacent the neutral terminal 6. As is known to those skilled in the art, the thermal fuse F is a non-resettable thermal link and comprises a current carrying device (generally incorporating a low melting point alloy) responsive to the application of external heat to non-resettably stop the passage of current therethrough.

A resistor 7 is connected at one end to the neutral input terminal 6 and at its other end to the right hand end of the sensor conductor 3 as viewed in the drawing, whereby the impedance (Z) of the material 4 and the resistor 7 are connected in series between the input terminals 5 and 6. The resistor 7 is thermally coupled to the thermal fuse F, as represented by a dotted line 8, whereby the generation of a predetermined amount of heat by virtue of sufficient current flowing through the resistor 7 will cause the fuse to blow.

The ends of the sensor conductor 3 are, as shown, connected together, which gives rise to the advantage that the overheat protection feature described hereinbelow continues to be provided in the event of a single break in the conductor 3. However, the ends of the conductor 3 need not be connected together. That is, the resistor need be connected only to one end of the conductor 3.

The above-described heating circuit operates in the following manner. When the terminals 5, 6 are connected to the AC power supply, current flows through the heating conductor 2 and warms the blanket or pad. Due to the presence of the diode D1, the heating current only flows during positive half-cycles of the supply voltage, that is to say during those half-cycles during which the live input terminal 5 is positive with respect to the netural input terminal 6. Accordingly, during positive half-cycles the heating current establishes a voltage gradient along the heating conductor 2, the voltage varying between a maximum value at its left hand end as viewed in the drawing to substantially zero at its right hand end. During negative half-cycles, since heating current does not flow the heating conductor 2 will be at a uniform potential along its length.

Current also flows between the input terminals 5 and 6 via the series combination of the resistor 7 and the impedance Z of the undoped PVC material 4. Under normal conditions the PVC material 4 is a good insulator whereby the current is small. Accordingly, little heat is generated by the resistor 7 and the thermal fuse 4 is unaffected by such heat. As the cable 1 warms up, the impedance of the PVC material 4 drops logarithmically so that the current flowing therethrough and through the resistor 7 increases. However, the circuit is so designed that at all normal operating temperatures the current through the resistor 7 is insufficient to cause enough heat to be generated to actuate the thermal fuse F. Suppose, however, that general overheating of the cable 1 occurs, that is to say that the PVC material 4 is heated along the length of the cable to a temperature approaching its melting point, which is about 160° C. The logarithmic impedance/temperature characteristic of the PVC material 4 is such that above about 140° C. there is a very large drop in the impedance, that is to say the material stops behaving as a good insulator. Accordingly, the current flowing through the impedance Z of the PVC material 4 and the resistor 7 becomes of an appreciable magnitude when the temperature of the material 4 is in the vicinity of its melting point, namely in a range of temperatures of about 140° to 160° C. The circuit is so designed that when the temperature of the material 4 reaches a value in this range the current through the resistor 7 is of a high enough value to heat the resistor sufficiently to cause the thermal fuse F to blow and therefore disconnect the heating circuit from the AC power supply.

Suppose now that instead of the cable 1 being overheated along its whole length, it becomes overheated at a localised position along its length, for example due to a ruck in the blanket or pad, a twisting or looping of the cable, or bunching of the wires of the cable. During positive half-cycles of the supply voltage, due to the voltage gradient along the heating conductor 2 the current that flows through the locally reduced impedance of the material 4 and the resistor 7 will vary between a maximum value if the overheat is at the left hand end of the cable 1 to substantially zero if the overheat is at the right hand end of the cable 1. However, during negative half-cycles, since the voltage along the heating conductor 2 is uniform the value of the current flowing through the resistor 7 will be the same wherever along the length of the cable 1 the overheat is situated. The circuit is so designed that in the event of such a local overheat the mean current flowing through the resistor 7 caused by the current flow during negative half-cycles is sufficient to cause blowing of the thermal fuse F. Accordingly, protection against both general and localised overheating is provided, the circuit being isolated from the supply if the material 4 attains a temperature of 160° C. or lower, whereby combustion cannot occur.

In some instances it is possible that in the event of an overheat the PVC material might melt whereby the outer sensor conductor 3 will collapse onto the inner heating conductor 2. The resultant short circuit is equivalent to the impedance Z of the material 4 dropping to substantially zero, whereby the current flowing through the resistor 7 will be ample to blow the thermal fuse F. In fact, if such an abrupt drop in the impedance occasioned by melting is deemed sufficient for signalling localised overheating, one can employ for the material 4 a substance that has an impedance that does not vary substantially with temperature below its melting point, for example polyethylene.

A disadvantage of the circuit of FIG. 1 is that a short-circuit failure of the diode D1 will result in doubling of the power dissipated by the heating conductor 2, since the AC supply voltage will no longer be rectified. Additionally, a short-circuit failure of the diode D1 will render the above-described localised overheating protection ineffective over around one third of the length of the cable 1 adjacent its right hand end as viewed in the drawing. Although the doubling of the power may not in itself be directly hazardous, it will cause the cable 1 to run at considerably elevated temperatures for long periods of time, with an attendant risk of the PVC material 4 ageing or hardening. The rendering of localised overheat protection partially ineffective is, of course, a direct hazard.

The likelihood of short-circuit failure of the diode D1 giving rise to the above disadvantages can be reduced by connecting a back-up diode in series with the diode D1, as described in our above-mentioned UK Pat. No. 1,599,709. However, even a series combination of two diodes will, apart from carrying the full load (heating) current, be subjected to reverse voltage transients which can cause reverse junction breakdown (zener effect) which can lead to short-circuit failure of a semiconductor chip or chips incorporating the diodes.

FIG. 2 shows a modified version of the circuit of FIG. 1 in which protection against short-circuit failure of the diode D1 is provided. Since the circuit of FIG. 2, which embodies the present invention, is in many respects similar to that of FIG. 1, it will only be described in so far as it differs therefrom.

In the circuit of FIG. 2, the resistor 7 (typically having a value of 10 kilohms) is re-positioned to be in series with the heating conductor 2 and the diode D1, with the conductor 2 connected between the resistor 7 and the diode D1. A second diode D2 is connected in parallel with the resistor 7 in such a sense that it conducts, and therefore bypasses the resistor 7, during positive half-cycles of the AC supply. That is, though the resistor 7 is connected in series with the heating conductor 2, the diode D2 ensures that the heating current does not flow through the resistor.

The circuit of FIG. 2 protects against localised and general overheating in much the same way as the circuit of FIG. 1, except that in FIG. 2 current can only flow through the resistor 7 during negative half-cycles of the supply voltage.

If the diode D1 in the circuit of FIG. 2 fails short-circuit, current will flow through the series combination of the resistor 8 and the heating conductor 2 during negative half-cycles of the supply voltage, which current will be sufficient to heat the resistor 7 to cause the thermal fuse F to blow. In other words, the resistor 7 will blow the thermal fuse F not only in the event of an overheat (localised or general) but also in the event of short-circuit failure of the diode D1. Thus, a greater degree of protection is provided and the need for a back-up series diode for the diode D1 becomes greatly reduced. In short, a short-circuit failure of the diode D1 renders the blanket safe, as is also of course the case for an open-circuit failure.

Failure of the diode D2 is unlikely because it is shunted by the resistor 7, which is of low impedance compared to the reverse impedance of the diode D1. Thus, although the diode D2 carries the heating current, it is unlikely to fail because it has little reverse voltage across it and supply-borne transients will be largely handled by the diode D1. The circuit in any event protects against open-circuit failure of the diode D2, since this will cause heating of the resistor 7 and cause the thermal fuse to blow. In the event of short-circuit failure of diode D2, the blanket will still be heated though the protection will no longer be provided.

Optionally, for which reason it is shown in dotted lines, a further diode D3 can be positioned where shown in series with the resistor 7 and the impedance of the material Z and be of such polarity that no current can flow through such series path (and therefore in particular through the impedance Z) during positive half-cycles of the supply voltage. That is to say, current is only permitted to flow through the impedance Z during negative half-cycles of the supply voltage, i.e. those half-cycles during which current can flow also through the resistor 7 in the event of an overheat.

FIGS. 3 to 5 show another heating circuit embodying the invention, which circuit is the same as that described with reference to FIG. 2 except that switch means 9 and a further diode D4 are provided, and the sensor conductor (designated 3′) is constructed of resistance wire to constitute a heating conductor. The switch means 9 is operative to enable the circuit to be selectively switched into any one of the configurations shown in FIGS. 3 to 5, respectively. The way in which the switch means 9 can be wired to the various parts of the circuit to effect the various configurations will be evident to the man skilled in the art and is not shown in FIGS. 3 to 5 in order that they will be readily comprehensible.

The conductor 2 is, for example, a 75 W conductor, that is to say it has a resistance of 385 ohms whereby when it is connected as shown in FIG. 3 and an AC supply voltage of 240 V r.m.s. is applied between the input terminals 5 and 6, the conductor will dissipate 75 W. The conductor 3, is, for example a 25 W conductor, having a resistance of 1156 ohms.

The configuration shown in FIG. 3 is the same as that shown in FIG. 2. That is to say, heating current flows through the conductor 2 whereby the circuit provides 75 W of heating. The conductor 3′ acts as a sensor conductor in the same way as the conductor 3 of FIG. 2 and heating current does not flow through it.

The configuration of FIG. 4 is the same as that shown in FIG. 3, except that the positions of the conductors 2 and 3′ are reversed so that the conductor 2 acts as the sensor conductor and heating current flows through the conductor 3′ whereby the circuit provides 25 W of heating.

The configuration of FIG. 5 is the same as that shown in FIG. 3, except as follows. The connection between the ends of the conductor 3′ (if provided) is removed, the diode D3 (if provided) is switched out, and the left hand end of the conductor 3′ as viewed in the drawing is connected view the diode D4 to either end of the diode D2 (e.g., as shown, to the end of the diode connected to the conductor 2) whereby the conductors 2 and 3′ are connected in parallel between the input terminals 5, 6 so that heating current flows through the two conductors in parallel during positive half-cycles and, therefore, 100 W of heating is provided. Note that, whereas the conductor 3' caries heating current, the impedance of the material 4 is still connected in series with the resistor 7 between the input terminals 5 and 6 and that the conductors 2 and 3' are at respective uniform potentials during negative half-cycles (the conductor 2 at live potential and the conductor 3' at neutral potential), whereby the overheat protection feature as described above with reference to FIG. 2 continues to be provided.

Thus, it will be appreciated that the circuit of FIG. 3 to 5, while being of simple construction and in particular comprising only a single dual coaxial heating cable, provides protection against overheating and enables different heat settings to be selected, the overheat protection being maintained irrespective of the heat setting.

The circuits described above with reference to FIG. 2 and FIGS. 3 to 5 can be modified within the scope of the invention, for example in the various ways that will now be described.

In the circuit of FIG. 2 and in the circuit configuration of FIGS. 3 and 4, the ends of the conductor 3, 3' or 2 (respectively) need not be connected together as shown. However, connection together of the ends is preferred, since this ensures that overheat protection continues to be provided, as described, in the event of a single break in the conductor 3, 3' or 2.

It is not essential that the half-wave rectifier means be one or more diodes such as the diode D1. It could instead comprise some form of controlled half-wave rectifier means, for instance a thyristor, whereby the heat output of the blanket could be made continuously variable and/or subject to control by ambient temperature. Such a modified form of the circuit of the invention would make the circuit particularly useful in an all-night electric underblanket or overblanket. In this connection, it is pointed out that in the absence of some form of normal temperature control means the illustrated circuits are best suited for use in pre-heating electric underblankets, electric pads and the like.

The illustrated heating circuits could comprise a semiconductor switch, for example a thyristor, whereby the heat output of the blanket could be continuously varied. If an ambient-temperature responsive element were included in a control circuit for the switch, the heating circuit would be suited for use in an all-night blanket. Further, the use of a semiconductor switch would enable the heating current to be shut off very quickly in the event of an arc due to a break in a heating conductor causing the insulation to fail between the two conductors of the cable. Such an arrangement would therefore offer not only protection against localised and general overheating, but also provide arc protection and a continuously variable heat output setting facility.

The thermal fuse F could be replaced by any other form of thermally-operative circuit interruption means of a resettable or non-resettable form, e.g. a bimetallic thermal cut-out or a PTC device as described in our UK patent application Publication No. GB 2 047 487 A.

I claim:

1. In a heating circuit comprising input terminals for connection to an AC supply, an elongate heating conductor, an elongate sensor conductor substantially coextensive with said heating conductor, separating means which separates said two conductors and which has an impedance that decreases with increasing temperature, thermally-operative circuit interruption means, first half-wave rectifier means connected in series with said circuit interruption means and said heating conductor between said input terminals whereby heating current can flow between said input terminals and through said heating conductor via said first half-wave rectifier means and said circuit interruption means, said sensor conductor being electrically connected to one only of said input terminals so that said heating current cannot flow through said sensor conductor, and a resistor electrically connected such that the resistor and the impedance of said separating means are connected in series between said input terminals, said resistor being thermally coupled to said circuit interruption means whereby in the event of overheating of said separating means the resultant drop in the impedance of the separating means will cause the current through the resistor to increase to heat the resistor to cause the circuit interruption means to disconnect the heating circuit from the AC supply, the improvement comprising:

said resistor being connected in series with said elongate heating conductor and said first half-wave rectifier means with the first elongate conductor connected between the resistor and the first half-wave rectifier means; and second half-wave rectifier means connected in parallel with said resistor in such a sense that it conducts and therefore bypasses the resistor during those half-cycles of the AC supply voltage during which said first half-wave rectifier means conducts.

2. A heating circuit according to claim 1, wherein a third half-wave rectifier means is connected in series with said resistor and the impedance of said separating means in such a sense that current can flow through said impedance only during those half-cycles of the AC supply voltage of opposite polarity to the said half-cycles during which said first and second half-wave rectifier means conduct.

3. A heating circuit according to claim 1, wherein the ends of said sensor conductor are connected together.

4. A heating circuit according to claim 1, wherein said thermally-operative circuit interruption means is a thermal fuse.

5. A heating circuit according to claim 1, wherein said heating and sensor conductors comprise respective conductors of a unitary heating cable and are each heating conductors having respective different heat outputs, the circuit comprising switch means capable of switching the circuit into two configurations in each of which a respective one of the cable conductors constitutes said heating conductor and the other one of the cable conductors constitutes said sensor conductor, each of said two configurations being such that heating current flowing, in use, between said input terminals passes through said heating conductor only.

6. A heating circuit according to claim 1, wherein said separating means comprises polyvinyl chloride.

7. In a heating circuit comprising input terminals for connection to an AC supply, an elongate heating conductor, an elongate sensor conductor substantially coextensive with said heating conductor, separating means which separates said two conductors and which will melt in the event of overheating to allow contact between the two conductors whereby its impedance will drop substantially to zero, thermally-operative circuit interruption means, first half-wave rectifier means connected in series with said circuit interruption means and said heating conductor between said input terminals whereby heating current can flow between said input terminals and through said heating conductor via said first half-wave rectifier means and said circuit interruption means, said sensor conductor being electrically connected to one only of said input terminals so that heating current cannot flow through said sensor conductor, and a resistor electrically connected such that the resistor and the impedance of said separating means are connected in series between said input terminals, said resistor being thermally coupled to said circuit interruption means whereby in the event of overheating of the separating means the resultant drop in the impedance of the separating means will cause the current through the resistor to increase to heat the resistor to cause the circuit interruption means to disconnect the heating circuit from the AC supply, the improvement comprising:

said resistor being connected in series with said elongate heating conductor and said first half-wave rectifier means with the first elongate conductor connected between the resistor and the first half-wave rectifier means; and second half-wave rectifier means connected in parallel with said resistor in such a sense that it conducts and therefore bypasses the resistor during those half-cycles of the AC supply voltage during which said first half-wave rectifier means conducts.

8. A heating circuit according to claim 7, wherein a third half-wave rectifier means is connected in series with said resistor and the impedance of said separating means in such a sense that current can flow through said impedance only during those half-cycles of the AC supply voltage of opposite polarity to the said half-cycles during which said first and second half-wave rectifier means conduct.

9. A heating circuit according to claim 7, wherein the ends of said sensor conductor are connected together.

10. A heating circuit according to claim 7, wherein said thermally-operative circuit interruption means is a thermal fuse.

11. A heating circuit according to claim 7, wherein said heating and sensor conductors comprise respective conductors of a unitary heating cable and are each heating conductors having respective different heat outputs, the circuit comprising switch means capable of switching the circuit into two configurations in each of which a respective one of the cable conductors constitutes said heating conductor and the other one of the cable conductors constitutes said sensor conductor, each of said two configurations being such that heating current flowing, in use, between said input terminals passes through said heating conductor only.

12. A heating circuit according to claim 7, wherein said separating means comprises polyethylene.

* * * * *